(12) United States Patent
Beveridge et al.

(10) Patent No.: US 12,277,433 B2
(45) Date of Patent: Apr. 15, 2025

(54) DESIRED STATE CONFIGURATION FOR VIRTUAL MACHINES

(71) Applicant: VMware LLC, Palo Alto, CA (US)

(72) Inventors: Daniel Beveridge, Palo Alto, CA (US); Ed Shmookler, Palo Alto, CA (US); Heath Reynolds, Palo Alto, CA (US); Mike O'Reilly, Palo Alto, CA (US); Pascal Laroche, Palo Alto, CA (US); Sean Lambert, Palo Alto, CA (US); Pranay Pareek, Palo Alto, CA (US); Amarnath Raghunathan, Palo Alto, CA (US); Steve Tilkens, Palo Alto, CA (US); Mark Peek, Palo Alto, CA (US); Yuriy Georgiev, Sofia (BG)

(73) Assignee: VMware LLC, Palo Alto, CA (US)

( * ) Notice: Subject to any disclaimer, the term of this patent is extended or adjusted under 35 U.S.C. 154(b) by 510 days.

(21) Appl. No.: 17/533,666

(22) Filed: Nov. 23, 2021

(65) Prior Publication Data
US 2023/0101776 A1 Mar. 30, 2023

Related U.S. Application Data

(60) Provisional application No. 63/248,724, filed on Sep. 27, 2021.

(51) Int. Cl.
*G06F 9/455* (2018.01)
*G06F 9/4401* (2018.01)
*G06F 9/445* (2018.01)

(52) U.S. Cl.
CPC ........ *G06F 9/45558* (2013.01); *G06F 9/4401* (2013.01); *G06F 9/4411* (2013.01); *G06F 9/44505* (2013.01); *G06F 2009/45575* (2013.01)

(58) Field of Classification Search
None
See application file for complete search history.

(56) References Cited

U.S. PATENT DOCUMENTS 9,354,896 B1 * 5/2016 Yang ..................... G06F 9/4401
9,836,330 B2 12/2017 Chen
(Continued)

OTHER PUBLICATIONS

U.S. Appl. No. 17/533,656 Non-Provisional Application filed Nov. 23, 2021, 65 pages.
(Continued)

*Primary Examiner* — Umut Onat
(74) *Attorney, Agent, or Firm* — King Intellectual Asset Management

(57) ABSTRACT

Systems and methods for setting virtual machines ("VMs") to desired configurations while the virtual machines are running. In some systems, a user can select a VM and a desired configuration. An agent can then set an attribute of the virtual machine to indicate that on guest operation system ("OS") reboot of the VM, the VM will enter BIOS mode. The agent can also store the desired configuration in the database based on authenticating the user. When the VM reboots at a future time, the attribute can cause the VM to enter BIOS setup. The agent can be notified and can retrieve the desired configuration from a database using an identifier for the VM. Then the agent can apply the desired configuration to the VM during BIOS setup with a system process that does not require further user authentication.

20 Claims, 6 Drawing Sheets

(56) References Cited

U.S. PATENT DOCUMENTS

| | | | |
|---|---|---|---|
| 10,866,895 B2* | 12/2020 | Ng | G06F 12/0846 |
| 11,494,217 B1* | 11/2022 | Krasilnikov | G06F 9/4416 |
| 2011/0179414 A1* | 7/2011 | Goggin | G06F 3/0683 |
| | | | 718/1 |
| 2011/0258441 A1 | 10/2011 | Ashok | |
| 2014/0010110 A1 | 1/2014 | Zeng et al. | |
| 2016/0041837 A1* | 2/2016 | Rangayya | H04L 41/0843 |
| | | | 718/1 |
| 2017/0220287 A1 | 8/2017 | Wei | |
| 2018/0129524 A1 | 5/2018 | Bryant | |
| 2019/0114199 A1 | 4/2019 | Aluvala | |
| 2020/0092334 A1* | 3/2020 | Hiebert | H04L 41/0816 |
| 2020/0167176 A1* | 5/2020 | Arroyo | G06F 9/45558 |
| 2020/0218544 A1 | 7/2020 | Ganesan | |
| 2021/0073035 A1 | 3/2021 | Duluk, Jr. | |
| 2023/0096716 A1 | 3/2023 | Beveridge et al. | |

OTHER PUBLICATIONS

U.S. Appl. No. 17/533,656 Non-Final Office Action dated May 3, 2023, 42 pages.
U.S. Appl. No. 17/533,656 Final Office Action dated Jul. 14, 2023, 45 pages.
U.S. Appl. No. 17/533,656 Non-Final Office Action dated Oct. 10, 2023, 44 pages.
U.S. Appl. No. 17/533,656 Final Office Action dated May 1, 2024, 49 pages.

* cited by examiner

DESIRED STATE CONFIGURATION FOR VIRTUAL MACHINES

CROSS REFERENCE TO RELATED APPLICATION

This application claims priority to U.S. provisional patent application No. 63/248,724 ("Desired State Configuration for Virtual Machines"), filed Sep. 27, 2021, which is incorporated by reference in its entirety.

BACKGROUND

Virtual machines often need to change configurations or functionality after they are already powered on. For example, the virtual machine ("VM") may need a new computer processing unit ("CPU") or memory configuration, may need migration to a new host or a designated resource pool, or may need any number of load balancing or other functions. There are some reconfigurations that can be done with the VM in a powered-on state, such as some types of migrations or adding another drive to the VM. However, to perform some other reconfigurations, such as changing processing and memory requirements, the VM typically needs to be powered off. Powering off virtual machines that are in a production environment usually requires planning and scheduling to minimize business impacts. In general, VM outages should be minimized and are undesirable because they often correlate to downtime for an application or service that end users would otherwise be using.

Current systems do not provide a way to reliably schedule reconfiguration of VMs without introducing additional VM downtime. Instead, current systems rely on shutting down the VM, supplying new configuration information, and restarting the VM. This can disrupt application performance that may rely on the VM. Additionally, scheduling downtime requires coordinating with the business to determine when the VM can be powered off safely. This coordination is extremely time consuming and results in reluctance to right-size VMs. Additionally, coordinating with administrative users to log in and make changes can be troublesome and result in longer downtimes than planned or be thrown off completely when an administrative user leaves the company days before a scheduled downtime.

As a result, a need exists for systems and methods for setting desired state configurations for virtual machines.

SUMMARY

Examples described herein include systems and methods for setting desired state configurations for virtual machines. In one example, a user can select a virtual machine and a desired configuration. An agent can then set an attribute of the VM to indicate that on guest operation system ("OS") reboot of the VM, the VM will enter BIOS mode. The agent can also store the desired configuration in the database based on authenticating the user. When the VM reboots at a future time, the attribute can cause the VM to enter BIOS setup. The agent can be notified and can retrieve the desired configuration from a database using an identifier for the VM. Then the agent can cause the VM to power off. The agent can apply the desired configuration to the VM after the VM enters BIOS setup, with some changes occurring when the VM is still powered on and other occurring when the VM is powered off. For example, the VM can be powered off completely and then changes can be made to the VM configuration file while it is powered off. After these changes to the configuration file are made, the VM can be powered on again. In this way, causing the VM to enter BIOS setup can effectively pause the VM so that changes can be made in either powered-on or powered-off states, depending on which changes are part of the desired configuration.

In one example, the system includes a VM desired state change ("VMDSC") service that interacts with a management server to reconfigure VMs in a virtual infrastructure. The VMDSC service can include an agent that causes the management server to make the reconfigurations when reboots of specified VMs are intercepted.

A VMDSC client can include a graphical user interface ("GUI") that an administrative user can access on a user device. The VMDSC client can be a web client in an example. The user can use the GUI to select one or more VMs and desired configurations for those VMs. A selected VM and desired configuration can then be sent from the client to the agent of the VMDSC service. The agent can cause the management server to set a flag of the VM to indicate the VM should enter BIOS setup on the next boot event. For purposes of this disclosure, the boot event can be an initial boot or a reboot event. The agent can also cause the management server to set a custom attribute of the VM to indicate the desired configuration exists or even to inject metadata into a file associated with the VM for purposes of conducting actions that are part of the custom configuration.

The agent can then subscribe to changes in a state of the BIOS setup flag of the VM. For example, the flag can initially be set to true to cause the VM to enter BIOS setup upon reboot (rather than completing reboot with existing settings). But when the VM enters BIOS setup, the flag can automatically be set to false. This change in state can then trigger notification of the agent. The notification can indicate the VM identifier, allowing the agent or a microservice on the management server to know which VM to reconfigure.

The agent can store the desired configuration in a database for retrieval when the VM is stuck in BIOS setup on reboot. When a reboot of the VM occurs, the VM can enter the BIOS setup based on the flag. Then, during BIOS setup, the agent can retrieve the desired configuration for that VM. For changes that require the VM to be powered-on, the agent can cause the management server to apply those changes to the VM before or after restarting the VM. But for changes to CPU usage, memory usage, or many others, the VM will first be powered off. While the VM is off, the agent can cause the management server to apply the changes to the VM configuration file and restart the VM with the new configuration. The power-on event can also trigger changes that need to occur when the VM is on, such as migrating the VM to a new host.

The VMDSC service and management server can validate the administrative user as a prerequisite to storing the desired configuration for one or more VMs. This can be done prior to the VM reboot, such as weeks before the reboot in some instances. The user need not be reauthenticated as part of applying the desired configuration to the VM at the time of reboot. Instead, a system session unassociated with a user can apply the new configuration. The user need not be authenticated at that future time as part of applying the desired configuration to the rebooting VM in the BIOS setup. Although the term "reboot" is used in examples herein, the same examples can apply to what is technically an initial boot. The terms "boot" and "next boot" are meant to capture either an initial boot or reboot.

The VMDSC client can display multiple VMs that are selectable on the GUI based on user credentials. For example, the user can only access VMs associated with their organization or group within the organization, in an example. The user can likewise be limited to particular types of actions and functions to include with the desired configuration. The desired configuration can include a number of CPUs, a memory size for use by the VM, or a GPU change. The desired configuration can also include migration criteria for migrating the VM to a stretch resource or moving the VM to a designated resource pool. In one example, the VM can be identified on the GUI as a zombie workload, in which case the desired configuration can include moving the VM to a silo with capped CPU and memory usage that is used to collected and cap performance of suspected zombie VMs.

The examples can also apply to a non-transitory, computer-readable medium including instructions for virtual machine state configuration. The instructions can be executed by a processor, causing the processor to perform stages of the examples. A system can also execute according to the examples.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for setting virtual machines to desired configurations. In one example, a user can select a virtual machine and a desired configuration. An agent can then set an attribute of the VM to indicate that the VM should enter BIOS mode upon reboot. The agent can also store the desired configuration in a database and register for notifications of a state change of the attribute. This can allow the agent to intercept the reboot of the guest OS of the VM at some later date when the VM is rebooted as part of a scheduled or adhoc reboot, maintenance period, or power down event. This can allow for changing the VM configuration without adding an additional VM outage. For example, when the VM reboots at a future time, the attribute can change, causing the agent to be notified that the VM has entered BIOS setup.

Once notified, the agent can retrieve the desired configuration from the database using an identifier for the VM. Then the agent can apply the desired configuration to the VM during BIOS setup. This can include powering off the VM, changing the VM configuration, and then powering the VM back on, all with a system process that does not require further user authentication. Some features of the desired configuration can also be applied when the VM is powered on, such as moving the VM to a different host. Application of the desired configuration can depend on which features are part of the desired configuration but can be accomplished by calling functions at the VM management platform. The VM management platform can set the VM accordingly with some changes being made while the VM remains in BIOS mode, and others made upon issuing a power-down to the VM and causing a complete shutdown. Shutting the VM down can enable changes to be made to the VM's main configuration file, some attributes of which may require a complete shutdown to alter. The VM management platform can then complete the reboot cycle of the VM by powering on the VM with the desired configuration in place.

Figure 1:
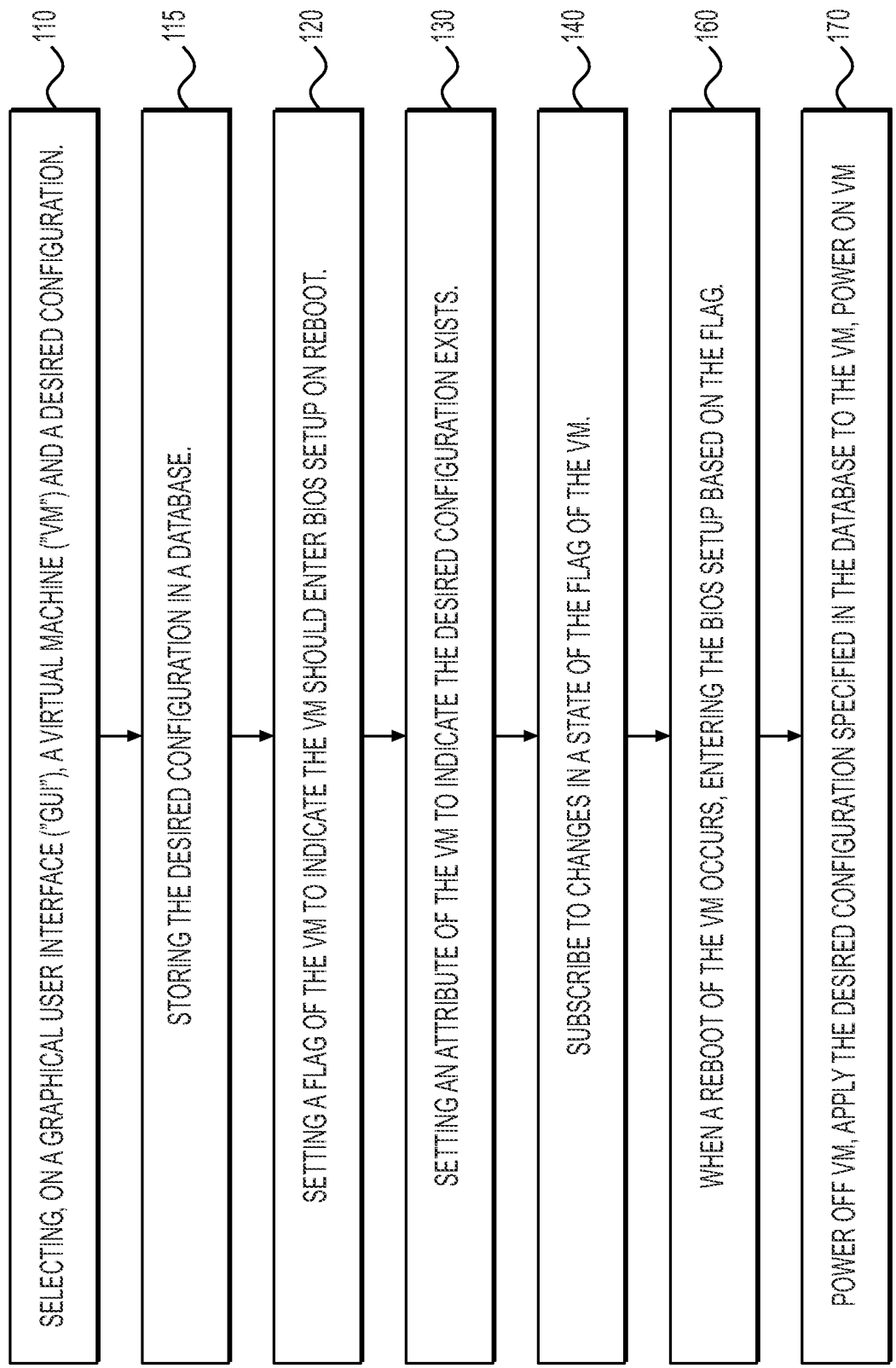
FIG. 1 is a flowchart of an exemplary method for setting a desired state configuration for a virtual machine.

FIG. 1 is a flowchart of an exemplary method for setting a desired state configuration for a virtual machine. The method can include presenting a GUI on a user device that acts as a client portal. The user device can be any processor-enabled device, such as a cell phone, laptop, tablet, or personal computer. Alternatively, the flowchart can receive configuration changes through an application programming interface ("API"), which can be utilized by an application seeking to change VM configurations.

The GUI can allow the user to log into the system. In some embodiments, the user or an application may access the service using the API. The user can be authenticated using tokens, key pairs, or any known authentication method. Based on the user's credentials, multiple VMs that the user is allowed to access or modify can be displayed on the GUI. In one example, the VMs are organized according to application or host. The VMs can include currently executing VMs, and the GUI can allow the user to set a desired configuration for one or more of those VMs without causing the VM to power off. The same may be achieved through one or more API calls issued by the authenticated user.

At stage 110, the agent receive a desired configuration for one or more VMs. The desired configuration can be received through an API call and can be based on GUI selections in an example. The GUI can receive a selection of a VM and a desired configuration for the VM. The VM can be selected from among the available VMs, such as by clicking on the VM that the user would potentially like to reconfigure. In one example, the GUI can display the VM's current configuration and options for selecting a desired configuration. The user can then save or submit these selections, which are sent to an agent on a server that operates to set the desired state configuration of the VM. The server can receive the selection of the VM and desired configuration from the user device. The server can be one or more servers that operate virtually on a physical host or that are one or more physical server devices. The server can function as a VM management workstation. The agent can execute as a process that communicates with the server or executes on the server.

The options for inclusion in the desired configuration can vary between examples. In one example, the desired configuration can include resource allocation and functionalities of the VM. For example, the desired configuration can specify a number of CPUs and amount of memory to allocate to the VM. This can allow the user to allocate more or less processing power or memory than is currently allocated to the VM. Similarly, the desired configuration can assign a graphics processing unit ("GPU") to the VM or specify a direct GPU passthrough mode for the VM.

Alternatively, the desired configuration can be selected from a window for changing VM functionality, such as moving the VM to a designated resource pool in a virtual center. In one example, the GUI can allow the user to specify a desired configuration that groups VMs into a resource silo that has defined CPU and memory limits and shares those resources between the VMs in the group.

One type of resource silo can be used to contain suspect zombie workloads. For example, a VM may be left over from an application that is no longer serving any users, yet the VM may still be requiring CPU and memory resources. Moving the VM to the zombie workload silo can ensure that the VM does not consume resources of other VMs that are in use. A zombie workload silo can have strict pool level limits on CPU and memory consumption, thereby capping the collective impact of zombie VMs without shutting them down. This can be a low-risk way to impede the resource drain of suspected zombie VMs as an interim step before they are fully decommissioned. Additional actions can be defined on the zombie resource pool, such as archival or deletion actions after a period of time.

Other actions that can be tied to the desired configuration can include addition or deletion of disk space used by the VM, VM archiving settings, and VM deletion. Deletions can place VMs in a trash folder, aging out the VMs after a defined period, such as six months. Migrations can be performed to maintain datacenter capacity below a certain level based on available CPUs or memory at the datacenter. Likewise, the desired configuration can specify a new host, resource pool, local cluster, or stretch cluster for the VM or to migrated to or even a new location such as a cloud partner or alternate datacenter. The stretch resource can be part of a stretched cluster that extends a local cluster from a single site to two sites for additional resource availability or inter-site load balancing. The stretch resource can include an additional host at the second site.

Actions and functions tied to the desired configuration can be performed by leveraging a software development kit ("SDK") or application programming interface ("API") of a VM management server. The SDK and API can allow external systems to interact with the server while ensuring compliance corporate governance and the right sizing of VMs.

In one example, the desired configuration can define multiple triggers and actions. For example, a trigger can be next VM reboot or power off, and an action can be to set VM memory to sixteen gigabytes and set VM vCPU core count to six. Additional example triggers and actions to define functions and actions in a desired configuration can include:

Trigger: (After Aug. 31, 2021, at midnight AND (next VM reboot OR power-off), AND AVG CPU utilization lower than 10% over last 90 days), Action (Migration VM to Zombie Resource Pool, AND notify VM owner, AND embed date of entry to Zombie pool into VM's 'Suspected Zombie' date field)

Trigger: (After current date minus 'Suspected Zombie date field'>90) Action (Archive VM AND notify VM owner of archive event).

Trigger: (Current date minus 'Owner Absent from Active Directory'>1 week), Action (Notify manager of absent owner and request reassignment of VM) AND embed date of this first reassignment request.

Trigger: (one week after first reassignment request with no response), Action (send second reassignment request)

Trigger (1 month after second reassignment request with no response), Action (Migration of VM to Zombie Resource Pool, AND notify VM owner or manager of absent owner, AND embed date of entry to Zombie pool into VM's 'Suspected Zombie' date field).

The options available for the desired configuration can depend on the user credentials, in an example. Some users can only change performance parameters such as CPUs and memory, whereas other users can move the VM to a silo or stretch resource. The authentication can occur as part of selecting the desired configuration even though the application of the desired configuration may occur weeks in the future. By authenticating the user ahead of time, the system can avoid issues that otherwise might arise if the user leaves the company or otherwise no longer has the correct credentials by the time the actual configuration change occurs at the VM in the future. If the user leaves the company, a new user with rights to the VM can also read the stored desired configuration and update the desired configuration as needed or desired. To do this, a GUI can allow a user to explore future configuration settings for a VM.

The agent can store the desired configuration in a database at stage 115. The database can be any repository accessible by the agent. In one example, the database can store the identifier for the VM along with the desired configuration for future retrieval. For example, after a user defines the desired state at stage 110, database entries for each setting change can be stored in the database.

Additionally, once the VM and desired configuration is received, the agent can configure flags and attributes of the VM to ensure that a future reboot of the VM is intercepted and used for changing the VM to the desired configuration. For example, at stage 120, the agent can set a flag to indicate the VM should enter BIOS setup on reboot. To do this, the agent can make an SDK or API function call to the VM management server. The server can set a flag on the VM by communicating with a hypervisor responsible for that VM. For example, the server can set the flag at a virtual disk file used by the hypervisor for the VM, such as in metadata embedded in a configuration file used by virtualization software. One such example is a VMX file which contains the VM configuration on VMware's vSphere platform, which can include one or more fields that are used as the flag. The flag can be an enterBiosSetup field for the VM, in an example. The agent can provide an identifier of the VM to the server so that the server knows which VM to flag or which VMX file to access for setting the flag, in an example. The identifier can be received by the agent as part of the VM selection made at the GUI.

At stage 130, the agent can also set an attribute for the VM that indicates a desired configuration exists for that VM. In one example, the system can keep a list of VMs with requested configuration changes. This can allow the management server to check for VMs in BIOS mode that are also in the list, in an example. This can reduce resources that could otherwise be consumed by checking for desired configurations for all VMs that enter BIOS mode, in an example.

In one example, setting the attribute can include making a function call that identifies the VM and one or more changes that are part of the desired configuration. For example, the function call can identify a new number of CPUs, a memory size, or a function change. The function change can include a migration or a load balancing action. As used herein, the terms flag and attribute can be considered synonymous. In another example, setting the attribute can be achieved by creating a database entry for the desired configuration in stage 115. In yet another example, setting the attribute can include making a reference to the VM configuration file so that the management server recognizes the configuration file needs to be modified to a desired configuration at the next available opportunity.

At stage 140, the agent can subscribe for notifications for when the flag changes state. For example, when the VM eventually reboots for some other purpose, such as scheduled maintenance, a true value for the flag can cause the VM to reboot into BIOS setup. Upon entering BIOS setup, the value of the flag can be changed, such as to false by the hypervisor itself. This change can be recognized by the server. The notification subscription can cause the server to notify the agent of the change. This can allow the agent to trap a reboot attempt for the VM that was already going to be initiated regardless of the request to change to the desired configuration.

At stage 160, when the VM reboots, the VM management server or hypervisor can cause the VM enter BIOS setup. This can effectively suspend the boot operation for intervention by the agent. Again, this can occur based on the flag being set within the VM's configuration file to indicate that the VM should enter BIOS setup on the next boot.

The VM can then remain in BOIS setup until a further action is taken to complete the boot process in an example. For example, the VM can remain in BIOS setup until the server sends a command to the hypervisor to complete the boot in an example.

The change in the state of the flag can also cause the agent to be notified. For example, a microservice at the server can poll a pool of VMs to determine if any of the VMs have the flag change state. The polling can occur at intervals and can encompass a group of VMs that have the attribute indicating that a stored desired configuration exists. The microservice can recognize the state change of the flag and can alert the agent that the VM is now ready for a configuration change. The agent can then retrieve the desired configuration from the database. This can be done by querying the database using the VM identifier, in an example. The notification received by the agent can include the VM identifier. The agent can perform further checking of the reconfiguration criteria. For example, the agent can evaluate criteria for making the configuration change, such as date and time information to ensure that the reboot event falls within specified timing criteria in order to proceed with the reconfiguration. If the reconfiguration event is not yet authorized to proceed due to timing or other considerations, no changes to the VM will be made and the VM can be powered off and back on without any alteration, with the 'Enter BIOS' flag being reset to 'true' in readiness for the next boot (e.g., boot from power off or a reboot) event. This can ensure that the VM again goes into BIOS mode so that the agent can recognize another opportunity to reconfigure the VM according to the stored desired configuration.

At stage 170, the agent can apply the desired configuration to the VM. The agent or the management server can send a power-off command to the hypervisor, causing the VM to power off. While the VM is powered off, the agent can make the desired configuration changes to the VM configuration file. This can include making SDK or API calls to the VM management server, which in turn can modify the configuration file. For example, application of the desired state may include powering off the VM so that changes can be made to the VM's VMX configuration file or a similar configuration file.

In some instances, some configuration changes are delayed until the VM is powered back on, at which point the VM management server can send commands to the VM through the hypervisor. The commands used to make the changes can depend on which desired configuration features were selected in stage 110.

A system session can be used to make the changes. This can avoid needing to authenticate the user who requested the changes. That user might not even be available when the configuration change occurs at stage 170. Instead, since the user was previously authenticated back when the desired configuration was specified, the system process can be used without any further authentication to effectuate the configuration changes at the VM.

When the changes have been successfully made, the agent or the server can send a command that causes the VM to power back on and go active with the desired configuration. If no reconfiguration changes are yet authorized to proceed due to timing criteria or other filters, the VM can complete the reboot cycle with no changes made to its configuration. The 'Enter BIOS' flag can be reset to 'true' in readiness for the next boot event.

Figure 2:
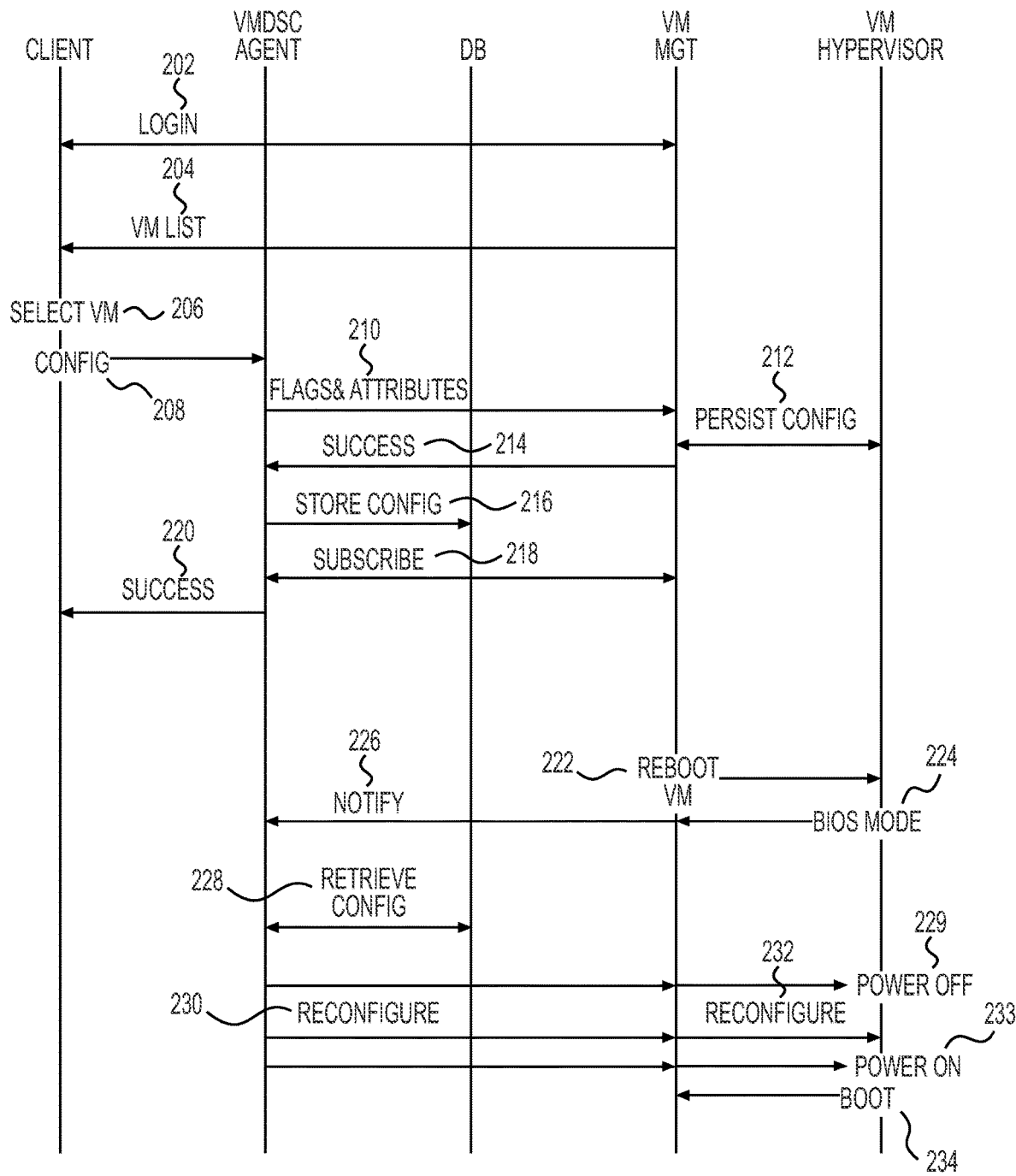
FIG. 2 is an exemplary sequence diagram for setting a desired state configuration for a virtual machine.

FIG. 2 is an exemplary sequence diagram for setting a desired state configuration for a virtual machine. At stage 202, a user can log in to the system at a client portal. The client can be a GUI that executes on a user device in an example. The GUI can be accessible as part of a web portal or web application, in an example. The login can include authenticating the user at the VM management server, in an example. Alternately, API calls can be made to the system to authenticate the user and select one or more VMs to reconfigure.

The server can determine which VMs the user can access. Different users can have access to different VMs of a single enterprise. Additionally, the system can serve users from multiple different enterprises (also called tenants). At stage 204, a VM list can be sent from the management server to the client portal. The VM list can include those VMs that the user has the rights to access and manipulate.

At stage 206, the GUI can present the VMs for selection by the user. The user can select one or more of the VMs. In one example, the VMs can be organized, such as by host or application. This can allow the user to locate the relevant VMs for reconfiguration. These functions can also be performed by means of an API call to the system.

At stage 208, the GUI can receive selections for a desired configuration for a selected VM. For example, the VM can have various functions and performance minimums or maximums available for selection by the user. The available selectable desired configurations can also be based on the rights of the authenticated user, and which functions are available for that VM and user. In one example, the GUI can display fields that allow the user to specify one or more of number of CPUs, amount of memory, number of GPUs, and load balancing criteria. The load balancing criteria can include rules on when to move the VM to a new host or for prioritizing the VM over other VMs when selecting a VM to migrate for load balancing purposes. The selectable criteria can also allow for selecting a VM migration to one or more of another cloud or other stretch resource, a designated resource pool, or a resource silo for zombie workloads. In one example, the user can also designate the VM for a fleet operation. The fleet operation can cause an entire application stack of VMs to be taken down when any one of them is in a reboot state. This can allow for bringing up a series of VMs together or in a required sequence.

One or more of these selections can make up the selected desired configuration. The GUI can commit the selections, such as by hitting a save or submit button on the GUI or by making the appropriate API call to the system. This can cause the client to send a VM identifier and desired configuration to the VMDSC agent for future implementation when the VM reboots for some other reason, such as for scheduled maintenance.

At stage 210, the agent can set flags and attributes for the identified VM to ensure that VM is trapped in BIOS setup the next time the VM reboots. The agent can make SDK or API calls to the VM management server ("VM MGT") to set the flags and attributes. For example, a property for entering BIOS setup can be set to true. Additionally, a command including the VM identifier and the desired configuration, such as number of CPUs and amount of memory, can be sent from the agent to the management server. The management server can check that the current configuration is different than the desired configuration for the VM. If so, the management server can set a custom VM attribute to true to indicate that a desired configuration exists for that VM.

At stage 212, the management server can also notify the hypervisor of the existence of the changes, in an example. The hypervisor may store the desired configuration in a file associated with the VM, in an example. In other examples, the hypervisor is notified only of the need to place the VM into BIOS setup mode upon next reboot. The server can maintain a pool of VMs for which desired configurations exist, in an example. This can allow a microservice to periodically poll those VMs to see if they are in BIOS setup and ready for reconfiguration, in an example.

If stage 210 results in a successful setting of the flag and attribute, then at stage 214 the server indicates this success back to the agent. The agent can then store the desired configuration at stage 216. In one example, the desired configuration is stored with the VM identifier in a database that is accessible by the agent.

At stage 218, the agent can subscribe for notifications when the flag changes states. For example, when the VM reboots into BIOS setup, the flag to enable BIOS setup can change from true to false. A microservice responsible for recognizing changes and providing notifications can then notify the agent of the change at that future time.

The agent can report the successful storing of the desired configuration at stage 220. This can cause the client GUI to display a success message to the user so that the user knows the desired configuration is set to take effect the next time the VM reboots.

At some future time or date, even weeks in the future in some examples, the VM can reboot at stage 222. The reboot can be part of a power down event or a scheduled maintenance event. In general, this event can be separate from the configuration setup performed by the user and avoid introducing additional VM downtime for the purpose of applying the desired configuration.

When the server reboots the VM, the BIOS flag can cause the hypervisor to set the VM into BIOS setup mode at stage 224. In one example, the VM just remains in the BIOS setup until further action is taken. The 'Enter BIOS' flag can be set to false by either the server or the hypervisor as part of the VM entering BIOS setup as the flag is understood to be a one-time operation which always resets upon the VM entering BIOS at next boot (which can be an initial boot or reboot).

Meanwhile, at stage 226, a microservice on the server can notify the agent that the 'Enter BIOS' flag changed states (e.g., from true to false). The notification can identify the VM. This can allow the agent to retrieve the stored desired configuration at stage 228. For example, the agent can use the VM identifier ("ID") from the notification to query the database. The database can retrieve the stored desired configuration using the VM ID and return the desired configuration to the agent. The agent can then perform addition validation that the reconfiguration is authorized to proceed. This can include checking of date and time criteria to ensure that time bound reconfigurations are ready to proceed. The validation can also include checking other trigger criteria that must be met before proceeding with the reconfiguration.

If the reconfiguration meets the criteria to proceed, at stage 229 the agent can send a command to power off the VM. In one example, the command can be sent to the VM management server, which can communicate with the hypervisor and cause the VM to power down. When the VM is powered off, the VM configuration file can be modified.

At stage 230, the agent can send a reconfiguration command to the server. The reconfiguration command can be an SDK or API call and can include the VM ID and the desired configuration. For example, the reconfiguration command can identify a setting, such as CPUs, and provide a value, such as one reflecting the number of CPUs. The command can also identify a function and a value indicating how to change the function. In one example, codes can be used by the agent to represent a migration and the value can identify where to migrate the VM.

If reconfigurations are authorized and ready to proceed, the server can receive and translate the reconfiguration command at stage 232 for action by the hypervisor. For example, the server can send the VM ID and one or more commands to the hypervisor to set various attributes of the VM after it has exited the BIOS setup mode with a power-off. This can include making changes to a VM configuration file. Additionally, the location where the VM will load can be changed. After these commands are successful, the server can indicate that the VM boot should complete. If no reconfiguration changes are ready and authorized to proceed, the VM can be marked as ready to boot unchanged and the 'Enter BIOS' flag can be set to true in readiness for the next boot event.

At stage 233, the agent can send a power-on command to the VM management server. The server can send a message to the hypervisor, causing the VM to power on with the configuration specified in the VM configuration file.

Additional reconfiguration can also occur when the VM is on. For example, some of the reconfiguration of stage 232 can be completed during the BIOS mode or when the VM is running. These typically can be changes to runtime elements, such as migration changes. These changes can also be applied separately and earlier in an example, since waiting for a VM boot event may not be necessary. Runtime changes that do not require changing the VM configuration file, such as migration changes, can be made while the VM is on or off, in an example.

At stage 234, the VM can complete the next boot with the desired configuration in place. The successful boot post reconfiguration can be indicated to the server, which can cease monitoring whether the VM is ready for the desired configuration. If pending reconfigurations were not ready to proceed due to filtering criteria (i.e., trigger criteria), the server can continue to monitor the VM for the next boot event and BIOS mode. For example, if a current date is before a beginning date that applies to the desired configuration, application of the desired configuration to the VM can be paused until a later time by resetting the BIOS mode flag to true and skipping the configuration changes. Additionally, some filtering criteria, such as a passed expiration date, can cause the desired configuration to be deleted without application to the VM.

Figure 3:
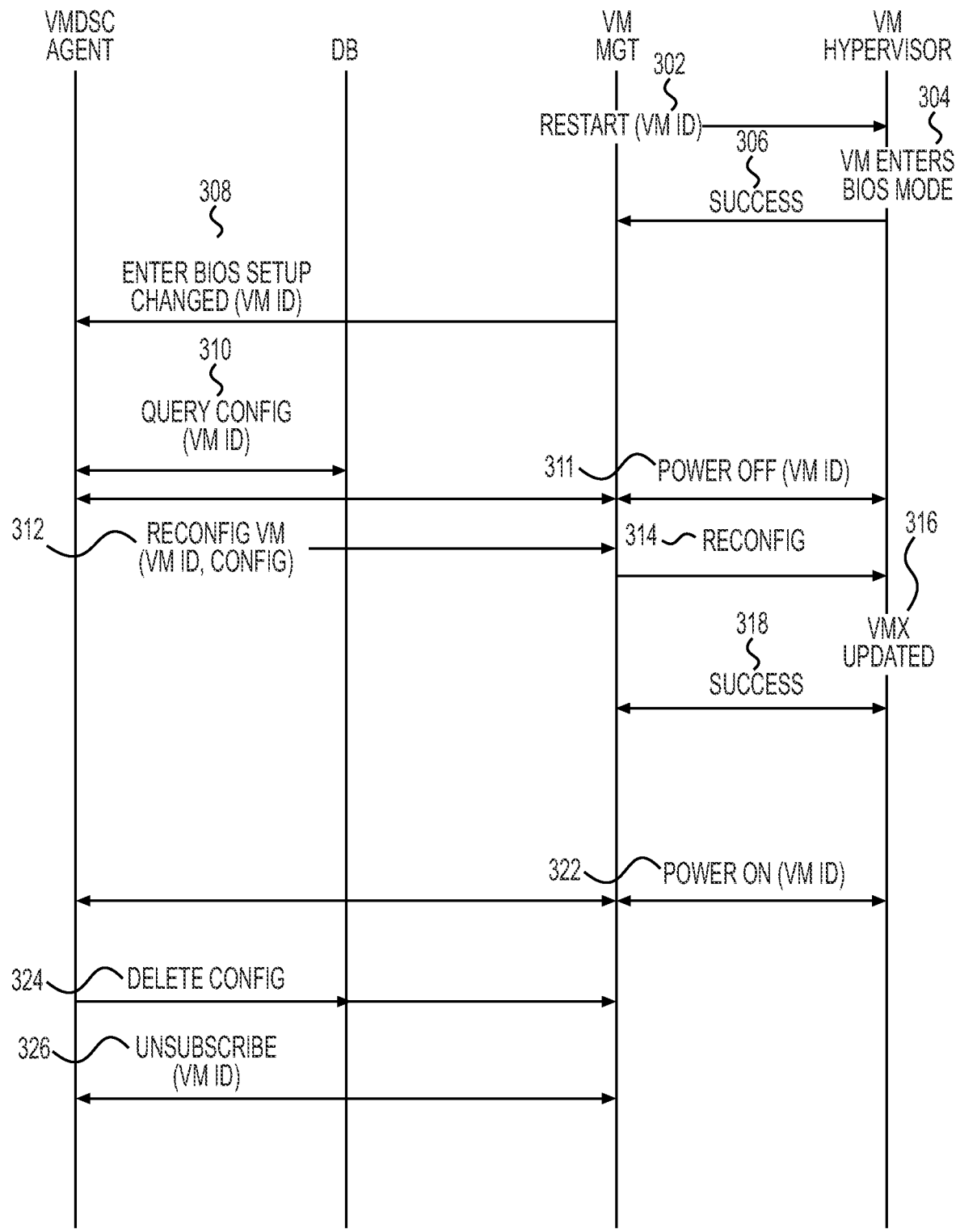
FIG. 3 is an exemplary sequence diagram for setting a desired state configuration for a virtual machine.

FIG. 3 is an exemplary sequence diagram for setting a desired state configuration for a VM when the VM reboots.

At stage 302, the server can initiate restarting of the VM. This can be done for any number of reasons, such as a scheduled maintenance, a periodic patch, or as part of a scheduled load balancing operation. The server can send a command to the hypervisor to start the VM, passing along the VM ID so that the hypervisor can identify the VM to restart.

When the VM boots (if powered off) or reboots, the 'Enter BIOS' flag can be true. This can cause the hypervisor to boot the VM into the BIOS setup mode at stage 304. The VM can remain in this BIOS setup until further action is taken. The hypervisor can report successful restart of the VM at stage 306.

At stage 308, the management server can notify the agent that the VM is in BIOS setup mode. In one example, the notification is based on a flag for EnterBiosSetup changing from true to false. This state change can occur automatically as part of the VM entering the BIOS setup. The notification can also indicate the ID of the VM to the agent.

At stage 310, the agent can query the database for the stored desired configuration. Trigger criteria can then be evaluated to ensure that the reconfiguration event is ready to proceed; example trigger criteria may include a Date/Time boundary before which the reconfiguration should not proceed, or a date/time range within which the reconfiguration can be completed, or the continued presence of the initiating employee at the company.

The server can then power off the VM by issuing a command and including the VM ID at stage 311. The hypervisor can shut down the VM, allowing for modification of the VM configuration file.

If the trigger criteria is met or does not exist, at stage 312, the agent can send a request to the management server to reconfigure the VM. The request can include the VM ID and the desired configuration.

Rather than revalidate the user that made the initial configuration change request, the management server can utilize a system session not associated with a user to make the changes. This can be important for keeping the process passive, since the user might not be available for a credential or permissions check at the time of the BIOS mode reboot. The system session can issue reconfiguration instructions to the hypervisor at stage 314. This can result in changes to the VM definition file, such as a VMX file, at stage 316. Acting upon data in the VMX fields can ensure scalability, decoupling from external sources so that VM boot storms do not cause associated massive queries (to Active Directory, for example). The triggers and actions discussed herein can be embedded into the VMX in an example.

When the changes are a success, the hypervisor can report the success back to the management server at stage 318.

The server can then power the VM back on with a command at stage 322. The VM can then boot with the desired configuration.

Confirmations, denials, or other notes or messages from this process can be reported back to the agent. The agent can store the information for user review in an example. For example, the GUI can allow for auditing and reporting based on the configuration changes.

If the server indicates the reconfiguration is a success, then at stage 324 the agent can delete the desired configuration entries for the VM from the database. Additionally, the agent can unsubscribe from flag notifications for that VM at stage 326. If the reconfiguration was not a success, then stages 324 and 326 can be skipped in an example and the agent can continue monitoring the VM state change flag. Additionally, the flag can be reset to true.

Figure 4A:
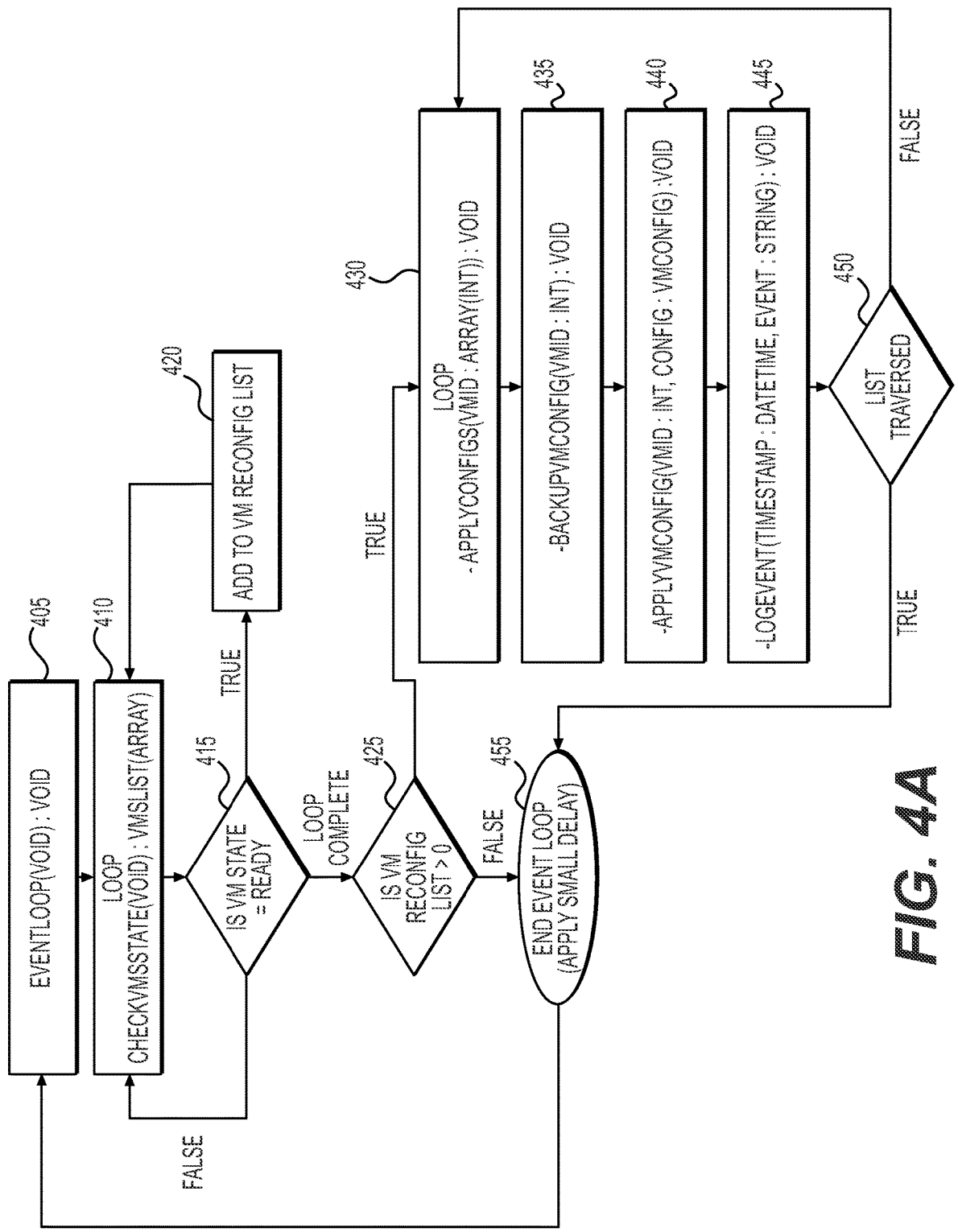
FIG. 4A is an exemplary flow chart for setting a desired state configuration for a virtual machine.

FIG. 4A is an exemplary flow chart for setting a desired state configuration for a virtual machine. The flow chart can be followed by a microservice at the server that tracks which VMs require reconfiguration, in an example.

At stage 405, the server microservice can begin an event loop. The purpose of the loop can be to poll a select pool of VMs to determine when VMs in the pool are ready for reconfiguration. At stage 410, the state of a VM in a VM list is checked. The VM list can be based on VMs that have been previously flagged for reconfiguration based on a received desired configuration. In another example, the list includes VMs that are in a BIOS state, awaiting action. At stage 415, the microservice can check to see if the VM is ready for reconfiguration. For a VM in a BIOS setup state, the VM can be deemed ready if it includes a custom attribute that indicates the existence of a desired configuration for that VM. If the VM is ready for reconfiguration, then it can be added to a list of VMs for reconfiguration at stage 420. The loop of stage 410 can continue for the VMs in the VM list.

When the loop is complete, at stage 425 the microservice can check whether the VM reconfiguration list is greater than zero. If not, then the loop ends at stage 455. There can be a preset delay such that polling does not begin again immediately. This can help conserve system resources.

If there are VMs in the reconfiguration list, then at stage 430 a second loop can begin. With the second loop, the microservice can apply desired configurations to the VMs that are ready for reconfiguration. This can include walking through the reconfiguration list with an integer counter, e.g., Array(int). At stage 430, the first VM ID can be selected from the reconfiguration list.

At stage 435, the existing configuration for the selected VM can be backed up. The microservice can store a snapshot of the VM in an example, such that current settings can be restored if something goes wrong with the reconfiguration. The backup can be stored in any accessible storage medium and can be encrypted in an example. In this example, the backup is accomplished using the BackupVMConfig function. The backup can be stored with the VM ID for later retrieval.

At stage 440, the microservice can execute a command to apply the desired configuration, which is represented in this example with VMConfig. The VMConfig can be retrieved from a database using the VM ID. For example, the VMConfig can indicate a number of CPUs and amount of memory for the VM. The VMConfig can also indicate a migration location, in another example. In the example of FIG. 4, the microservice can call a command ApplyVMConfig to cause the desired configuration to be applied to the VM.

At stage 445, the microservice can log the configuration changes. This can include storing a timestamp and a string representing what changes were made. The log can be checked later using the client GUI, in an example. If adverse changes occur to the virtual environment, the GUI can allow a user to back out changes to VMs based on the log and the stored backup configurations.

The second loop can continue until stages 435, 440, and 445 have been applied to all the VMs in the reconfiguration list. Once the reconfiguration list has been traversed at stage 450, the loop event can end at stage 455. Delay can be applied before the microservice again polls for VMs to reconfigure at stage 405.

Figure 4B:
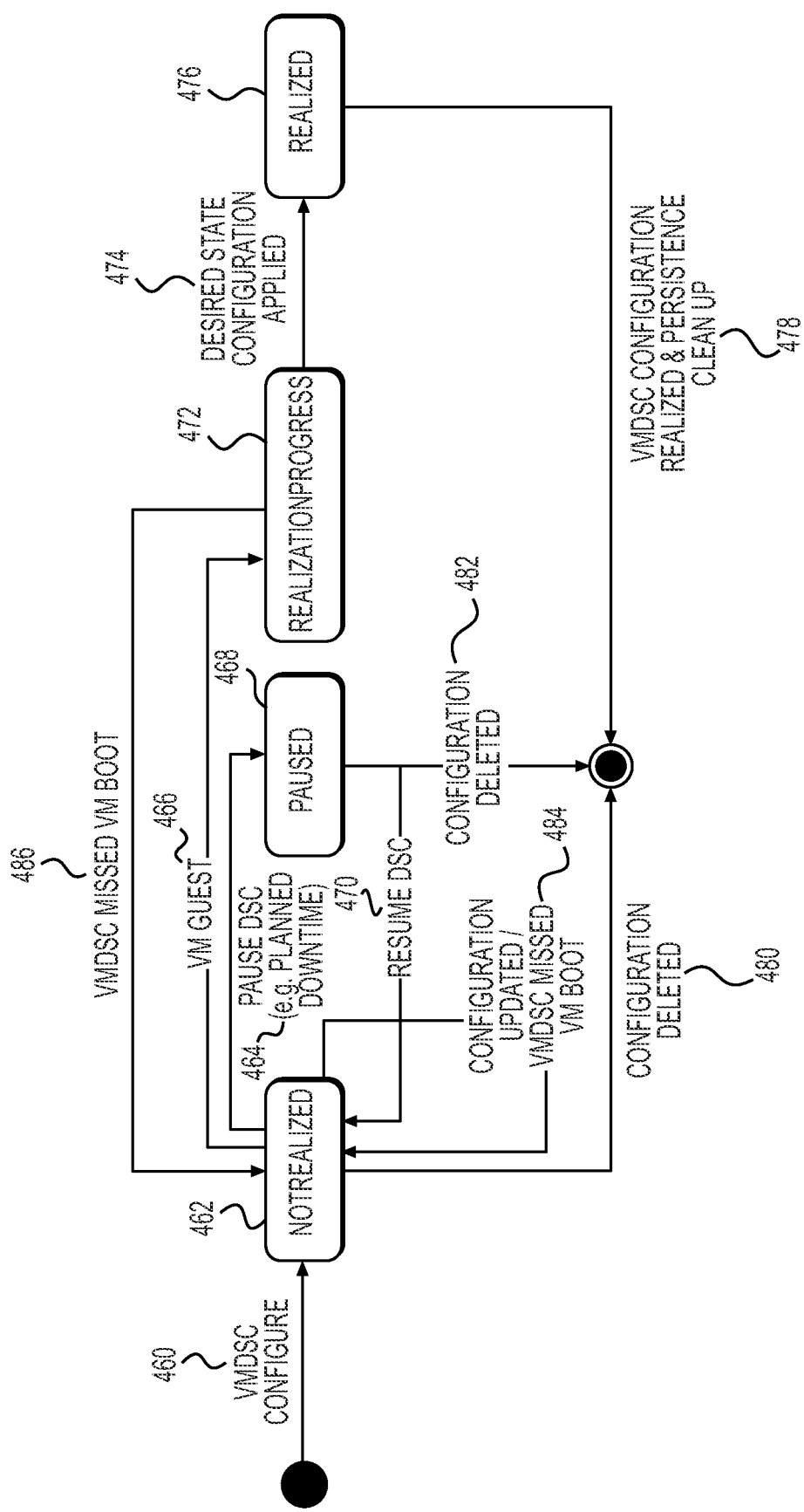
FIG. 4B is an exemplary flow chart for setting a desired state configuration for a virtual machine.

FIG. 4B is an exemplary flow chart for setting a desired state configuration for a virtual machine. At stage 460 the VMDSC service can receive input to reconfigure a VM, either from an application making API calls or from an administrative user. The VM can initially have an unrealized state. At stage 462, the desired configuration can have been received but the VM has still not realized the desired configuration. The configuration instead can be stored and the system can wait until it is time to initialize the VM or boot (e.g., reboot) the VM as part of a scheduled maintenance window. The boot can be a reboot initiated by the OS, or it can be some other boot. For example, the boot can be part of a maintenance operation that contacts VMDSC and powers the VM off and then powers the VM back on or initiates the boot of the VM for the first time.

At stage 466, a VM guest OS reboot can occur, such as described previously in FIG. 3. During the boot cycle, the realization can be in progress at stage 472. The VM boot cycle can be captured by the system. At stage 474, the VMDSC service can apply the desired configuration to the VM. The VM can be restarted, and at stage 476, the VM can complete the boot cycle with the desired configuration being in a realized state. Cleanup can occur at stage 478, and the stored configuration can be deleted at stage 480.

The system can also ensure that the configuration is applied to the VM even when other less ideal scenarios arise, such as crash scenarios. For example, the VMDSC service can be shut down, either intentionally or unintentionally. In that scenario, at stage 484 the configuration may be updated but the VMDSC service can miss the next boot of the VM. In that case, the desired configuration can remain unrealized and the VM may require a subsequent booting at stage 466 once the VMDSC is running again.

Sometimes the subscription for monitoring the VM and changing the configuration needs to be re-established, such as upon an a keep alive session extension or during re-establishing of a session upon an expired session with the VM management server notifying of VM reboot. For example, the VMDSC service can crash or be shut down during realization of the configuration at stage 472. When this happens, it is possible that the VM will not realize the configuration change at 472. For example, the agent may not be executing or receive notice of the VM entering BIOS setup mode. Instead, the VM can restart with the prior configuration or less than all the configuration changes. For example, if the VM is restarted based on a crash, and the VMDSC service can miss the boot event at stage 486. This can result in the VM configuration file not be fully updated to reflect the desired configuration change, in an example. When the VMDSC misses the boot at stage 486, at least some of the configuration changes may remain unrealized at stage 462. The configuration can be rolled back to unrealized. This can include resetting the flag of the VM to indicate the VM should enter BIOS setup on a subsequent boot.

While in a not realized state at stage 462, the desired configuration change can also be paused at stage 468. For example, for a downtime period or during some planned event, the application owner may wish to avoid any changes to the application service. Alternatively, the new configuration may be planned for some future date in anticipation of an event. In such cases, the system can update the configuration criteria to reflect a pause so that even if the VM restarts the VMDSC will not attempt to realize the desired configuration. This can include setting timing criteria that acts as an earliest or latest date and time in which the configuration change can occur. Alternatively, the system can pause the state change by temporarily removing the VM from a list of VMs being monitored by the VMDSC for configuration changes. In still another example, the system can require approval of the desired configuration change by an administrative user or client user. The paused stage 468 can persist until such approval is received, at which point the desired state change can resume at stage 470 and be ready for application at the next boot at stage 466.

In another example, the system can pause application of the desired configuration to the VM during downtime of some portion of the VMDSC service that is needed for applying the desired configuration. In one example, the VMDSC can track which VMs need an update. When the downtime ends, the agent can reinstate the desired configuration for application to the VM at a subsequent boot. For example, the agent can cause the flag to be set for entering into BIOS setup.

The desired configuration can also be cancelled or deleted in an example. For example, if approval of the desired configuration change is not received within a threshold period, the configuration can be deleted at stage 482. In another example, the configuration change can be cancelled by an administrative user, causing the configuration to be deleted at stage 482. In still another example, if the configuration criteria includes an expiration date and the desired configuration has not been applied by that date, the configuration can be deleted at stage 482.

Figure 5:
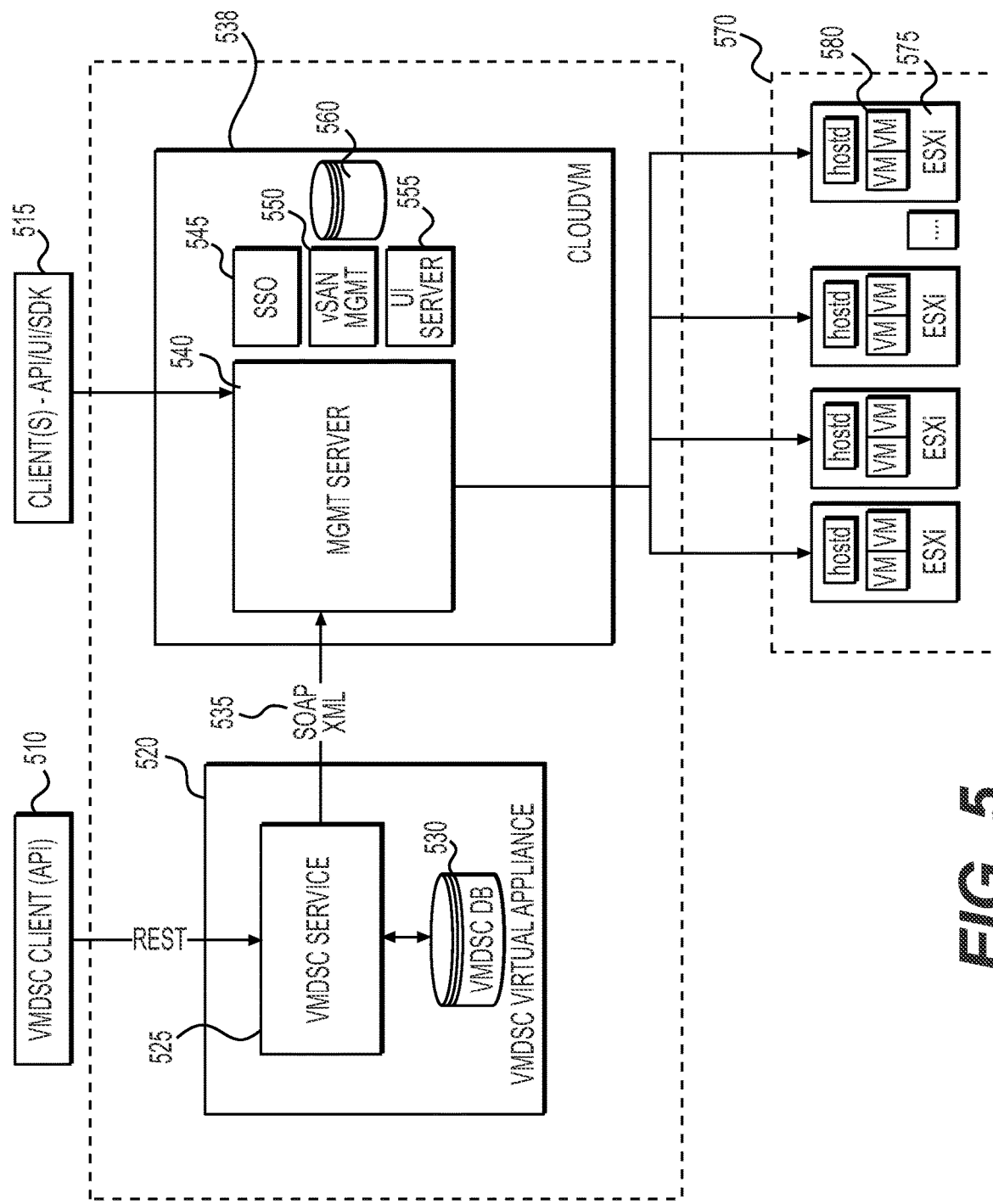
FIG. 5 is an exemplary illustration of system components for setting a desired state configuration for a virtual machine.

FIG. 5 is an exemplary illustration of system components for setting a desired state configuration for a virtual machine. A VMDSC client 510 can include a GUI that gives a user access to the agent functions, which can run as part of VMDSC service 525 of virtual appliance 520. The client 510 can be an application that runs on a user device or can be a web application that the user device accesses remotely.

The VMDSC client 510 can also include API support in an example. This can also allow for external systems 515 to interact with the VMDSC service 510 or management server 540 to ensure compliance with corporate governance. API support can also allow for upstream integrations and higher-level consumers of the VMDSC service 525, and for the right sizing of VMs driven by other services.

The VMDSC service 525 can allow administrative users to specify the desired configuration state for virtual machines 580, as has been described in the examples above. As discussed, the VMDSC service 525 can intercept the next VM guest OS reboot event, power off the VM prior to the guest OS boot process and modify the configuration (e.g., CPU, memory, or other functionality). In some examples, no hardware downtime is required. Enterprise patching and management systems can instead issue an OS reboot, but the reboot is intercepted to allow for changing the VM configuration during maintenance window activity.

Then the VMDSC service 525 can power on the VM, resulting in the realization of the desired configuration state. The entire VMDSC process can take only moments to perform in an example and can avoid introducing additional VM downtime by taking advantage of regular VM 580 reboot events. VM reboot events can include patching, application updates, and other scheduled downtime. This can assist organizations with reclaiming compute resources, rightsizing a VM allotment, and lowering carbon footprint.

The VMDSC service 525 (including the agent) can store the desired configuration in a database 530. This can allow for retrieval of the configuration for the VM 580 when the VM 580 is stuck in BIOS setup.

In one example, the VMDSC virtual appliance 520 can execute virtually in the cloud. The VMDSC virtual appliance 520 can communicate with the management server 540 and send commands 535 for reconfiguring VMs. In one example, the commands can use the SOAP messaging protocol and XML to specify desired VM configurations to the management server 540. Communication with the management server 540 can be accomplished with API calls in an example. In one example, the VMDSC service 525 can generate reports on VMDSC events. Such reporting can include cost analysis of savings associated with the implementation of desired configurations over a time period.

The management server 540 can be one or more servers that manage virtual infrastructure 570, which can include hypervisors 575 such as ESXi and VMs 580. The management server 540 can execute in a virtual cloud 538 that can be the same or different than where the VMDSC virtual appliance 520 is hosted. The user can log into the VMDSC service 525 and single sign on ("SSO") 545 can be used to also authenticate the user with the management server 540 in an example. SSO 545 can simplify administration by allowing a user to log in once and then access all instances of the management server 540 without further authentication.

The management server 540 can provide centralized management of virtual infrastructure 570, in an example. The management server 540 can allow administrative user to reduce the complexity of managing the virtual infrastructure 570 by providing centralized access and control of virtualized hosts and virtual machines from a console. The console can be a web interface hosted by a user interface server 555, in an example. In one example, the VMDSC client 510 can be part of the console. Both can be part of a web client, allowing a user to access features remotely.

The management server 540 can also store metadata regarding the virtual infrastructure 570 in one or more databases 560. The databases 560 can be accessed using virtual storage area network ("vSAN") management 550, in an example. vSAN 550 can pool together storage devices across a cluster to create a distributed shared data store 560.

The management server 540 or VMDSC server 520 can include a microservice that monitors for VMs 580 that are stuck in BIOS setup by polling the MGMT server 540. The microservice can be part of the agent in an example. This monitoring can be triggered intentionally by the VMDSC service 525 for purposes of reconfiguring selected VMs 580. The microservice can poll the management server 540 at an interval to determine if the status of the "Enter BIOS" flag has changed for the VMs 580. Then the microservice can reconfigure the VMs in the BIOS state. This can include powering off the VMs, applying the desired configuration to a VM configuration file, and then restarting the VMs, in an example.

This approach can avoid the need to directly change the BIOS code of VMs 580. Instead, the BIOS mode can be leveraged to reconfigure the VM 580 prior to the reboot. The VM 580 can be powered off and back on with the desired configuration. This can allow administrators to schedule configuration changes for VMs 580 without adding extra outages for the VMs 580.

The VMDSC service 525 can have downtime and unavailability that can span anywhere from seconds to multiple hours. A downtime on VMDSC service 525 can happen during application of a desired state configuration to one or more VMs 580 or during steady state operation. During this time, VMs 580 can undergo an OS restart. Upon restart, the VMDSC service 525 can capture this condition and "reinstate" the VMDSC schedule upon the subsequent reboot of the VM. For example, the VMDSC service 525 can follow the stages explained in the flowchart of FIG. 4B. The VMDSC service 525 can also reinstate a VMDSC schedule when VMs 580 reboot but the trigger criteria for the desired configuration is not yet met. Reinstating the schedule can include resetting the "Enter BIOS" flag to true, in an example. For example, if a VM attribute still indicates the desired configuration exists for the VM, the agent can cause the BIOS flag to be reset.

Other examples of the disclosure will be apparent to those skilled in the art from consideration of the specification and practice of the examples disclosed herein. Though some of the described methods have been presented as a series of stages, it should be appreciated that one or more stages can occur simultaneously, in an overlapping fashion, or in a different order. The order of stages presented are only illustrative of the possibilities and those stages can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for virtual machine state configuration, comprising:
   receiving a desired configuration for future application to a virtual machine ("VM");
   setting a flag of the VM to indicate the VM should enter BIOS setup on next boot, wherein an agent responsible for applying the desired configuration subscribes for notification of the VM entering BIOS mode;
   based on a determination that the agent has not applied the desired configuration to the VM after the VM has entered the BIOS setup on the next boot, reapplying the flag setting of the VM; and
   based on the agent receiving a notification that the VM has entered the BIOS setup on a subsequent boot, applying the desired configuration to the VM.

2. The method of claim 1, wherein applying the desired configuration includes powering off the VM, modifying a definition file for the VM, and powering on the VM.

3. The method of claim 1, wherein the agent fails to apply the desired configuration based on missing the notification as part of scheduled downtime to a desired state change service that utilizes the agent.

4. The method of claim 1, wherein the agent fails to apply the desired configuration based on the agent crashing, and wherein the agent executes again prior to receiving the notification on the subsequent boot.

5. The method of claim 1, wherein the agent fails to apply the desired configuration based on trigger criteria for the desired configuration being unmet.

6. The method of claim 5, wherein the trigger criteria includes a date requirement for when the desired configuration can be applied.

7. The method of claim 1, wherein the desired configuration includes changes to amounts of computer processing units and memory utilized by the VM.

8. A non-transitory, computer-readable medium including instructions for virtual machine state configuration, wherein the instructions are executed by a processor, causing the processor to perform stages comprising:
   receiving a desired configuration for future application to a virtual machine ("VM");
   setting a flag of the VM to indicate the VM should enter BIOS setup on next boot, wherein an agent responsible for applying the desired configuration subscribes for notification of the VM entering BIOS mode;
   based on a time expiring for the agent to apply the desired configuration, resetting the flag of the VM to cause the VM to enter the BIOS setup on a subsequent boot; and when the VM enters the BIOS setup on the subsequent boot, powering off the VM, applying the desired configuration, and powering on the VM.

9. The non-transitory, computer-readable medium of claim 8, wherein the agent is paused for a scheduled period, during which the time expires.

10. The non-transitory, computer-readable medium of claim 8, the stages further comprising deleting the desired configuration after an expiration period.

11. The non-transitory, computer-readable medium of claim 8, the stages further comprising rolling back the VM from the desired configuration to a prior configuration based on the time expiring.

12. The non-transitory, computer-readable medium of claim 8, wherein the agent fails to apply the desired configuration based on trigger criteria for the desired configuration being unmet.

13. The non-transitory, computer-readable medium of claim 12, wherein the trigger criteria includes a date requirement for when the desired configuration can be applied.

14. The non-transitory, computer-readable medium of claim 8, wherein the desired configuration includes changing a number of computer processing units and memory size for the VM.

15. A system for virtual machine state configuration, comprising:
a non-transitory, computer-readable medium containing instructions; and
a processor that executes the instructions to perform stages comprising:
receiving a desired configuration for future application to a virtual machine ("VM");
setting a flag of the VM to indicate the VM should enter BIOS setup on next boot, wherein an agent responsible for applying the desired configuration subscribes for notification of the VM entering BIOS mode;
when the agent fails to apply the desired configuration after the next boot, resetting the flag of the VM to cause the VM to enter the BIOS setup on a subsequent boot; and
when the VM enters the BIOS setup on the subsequent boot, powering off the VM, applying the desired configuration, and powering on the VM.

16. The system of claim 15, wherein the agent is paused when the next boot occurs.

17. The system of claim 15, the stages further comprising deleting the desired configuration after an expiration period.

18. The system of claim 15, the stages further comprising rolling back the VM from the desired configuration to a prior configuration based on the time expiring.

19. The system of claim 15, wherein the agent fails to apply the desired configuration based on trigger criteria for the desired configuration being unmet.

20. The system of claim 15, wherein the desired configuration includes changing a number of computer processing units and memory size for the VM.

* * * * *